United States Patent
Pyun et al.

(10) Patent No.: US 12,501,398 B2
(45) Date of Patent: Dec. 16, 2025

(54) USER INFORMATION GENERATION METHOD AND DEVICE

(71) Applicant: INDUSTRY-ACADEMIC COOPERATION FOUNDATION, CHOSUN UNIVERSITY, Gwangju (KR)

(72) Inventors: Jae Young Pyun, Gwangju (KR); Dae Ho Kim, Jeollanam-do (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 405 days.

(21) Appl. No.: 18/180,617

(22) Filed: Mar. 8, 2023

(65) Prior Publication Data

US 2023/0224852 A1 Jul. 13, 2023

Related U.S. Application Data

(63) Continuation of application No. PCT/KR2022/002308, filed on Feb. 16, 2022.

(30) Foreign Application Priority Data

Feb. 16, 2021 (KR) .................. 10-2021-0020360

(51) Int. Cl.
*H04W 64/00* (2009.01)
*H04B 17/327* (2015.01)
*H04W 48/10* (2009.01)

(52) U.S. Cl.
CPC ........ *H04W 64/006* (2013.01); *H04B 17/327* (2015.01); *H04W 48/10* (2013.01)

(58) Field of Classification Search
CPC ............... H04W 64/006; H04W 64/00
(Continued)

(56) References Cited

U.S. PATENT DOCUMENTS

2018/0158108 A1* 6/2018 Muttineni .......... G06Q 30/0267

FOREIGN PATENT DOCUMENTS

| KR | 10-2012-0072170 A | 7/2012 |
| KR | 10-2014-0056828 A | 5/2014 |

(Continued)

OTHER PUBLICATIONS

International Search Report mailed May 17, 2022 in International Application No. PCT/KR2022/002308.

(Continued)

*Primary Examiner* — Qutbuddin Ghulamali
(74) *Attorney, Agent, or Firm* — Knobbe, Martens, Olson & Bear, LLP

(57) ABSTRACT

A user information generation method and apparatus is proposed. The method may include collecting, from at least one smart device counting apparatus, smart device count information generated using a signal transmitted by at least one smart device within a predetermined range. The method may also include generating user count information as a result of calculating a number of users within the range by applying an average number of smart devices possessed by each person to the smart device count information. The method may further include generating location estimation information about the smart device, based on the smart device count information, and generating movement trend detection information about users based on the location estimation information about the smart device, the user count information, and map information.

12 Claims, 9 Drawing Sheets

(58) Field of Classification Search
USPC .................................................... 455/456.1
See application file for complete search history.

(56) References Cited

FOREIGN PATENT DOCUMENTS

| | | | | |
|---|---|---|---|---|
| KR | 10-1417922 B1 | 7/2014 | | |
| KR | 1417922 B1 * | 7/2014 | ............ | H04W 64/00 |
| KR | 10-1480348 B1 | 1/2015 | | |
| KR | 10-2016-0085065 A | 7/2016 | | |
| KR | 10-2018-0067784 A | 6/2018 | | |
| KR | 20180067784 A * | 6/2018 | ............... | G01S 1/68 |
| KR | 10-2019-0018129 A | 2/2019 | | |
| KR | 20190018129 A * | 2/2019 | ......... | G07C 9/00166 |

OTHER PUBLICATIONS

Office Action dated Apr. 1, 2022 in Korean Application No. 10-2021-0020360.
Final Office Action dated Jul. 1, 2022 in Korean Application No. 10-2021-0020360.
Notice of Allowance dated Nov. 1, 2022 in Korean Application No. 10-2021-0020360.

* cited by examiner

FIG. 5

```
COM3 - Tera Term VI
MENU  EDIT  SETTING CONTROL  WINDOW  HELP
DEVICE MAC ADDRESS: E7:53:24:46:8D:CC
Scanning started (interval: 625ms, window: 312ms, timeout: 5000ms).
            No.   MAC Address      Type   RSSI
             1    d121951c4f59     000    -75
             2    c100bb00375a     110    -82
             3    f510c26dd06e     000    -67
             4    6b4a7aeafc89     110    -69
             5    70bf2426cf00     110    -34
             6    6b6453d28038     110    -64
             7    70bf2426cf00     110    -34
             8    70bf2426cf00     110    -41
             9    d121951c4f59     000    -73
            10    c100bb00375a     110    -79
            11    f510c26dd06e     000    -69
            12    6b6453d28038     110    -66
            13    fd2a62d4a06e     000    -82
            14    70bf2426cf00     110    -42
            15    6b4a7aeafc89     110    -76
            16    d121951c4f59     000    -79
            17    6b6453d28038     110    -67
            18    6b4a7aeafc89     110    -78
            19    6b6453d28038     110    -68
            20    c100bb00375a     110    -80
            21    f510c26dd06e     000    -70
            22    6b4a7aeafc89     110    -69
            23    6b6453d28038     110    -62
            24    d121951c4f59     000    -69
            25    70bf2426cf00     110    -64
            26    f510c26dd06e     000    -70
            27    6b4a7aeafc89     110    -76
            28    70bf2426cf00     110    -49
            29    c100bb00375a     110    -79
            30    70bf2426cf00     110    -55
            31    6b4a7aeafc89     110    -74
            32    6b6453d28038     110    -64
            33    d121951c4f59     110    -83
            34    fa6ab5780a95     000    -62
            35    70bf2426cf00     110    -49
            36    6b4a7aeafc89     110    -66
            37    c100bb00375a     110    -79
            38    6b6453d28038     110    -60
            39    fa6ab5780a95     000    -58
            40    f510c26dd06e     000    -69
            41    d121951c4f59     110    -73
            42    6b4a7aeafc89     110    -70
            43    6b6453d28038     110    -62
            44    c100bb00375a     110    -78
            45    fa6ab5780a95     000    -61
            46    f510c26dd06e     000    -71
Stopped scanning due to timeout parameter
We have scanned for 4995ms with an interval of 1000 timeslots and a window of 500 timeslots
We have been listening on the radio for at least 2187ms
```

FIG. 6

|   | A   | B            | C    | D    |
|---|-----|--------------|------|------|
| 1 | No. | MAC Address  | Type | RSSI |
| 2 | 1   | d121951c4f59 | 0    | -75  |
| 3 | 2   | c100bb00375a | 110  | -82  |
| 4 | 3   | f510c26dd06e | 0    | -67  |
| 5 | 4   | 6b4a7aeafc89 | 110  | -69  |
| 6 | 5   | 70bf2426cf00 | 110  | -34  |
| 7 | 6   | 6b6453d28038 | 110  | -64  |
| 8 | 7   | fd2a62d4a06e | 0    | -82  |
| 9 | 8   | fa6ab5780a95 | 0    | -62  |

FIG. 7

|   | A   | B            | C    | D    |
|---|-----|--------------|------|------|
| 1 | No. | MAC Address  | Type | RSSI |
| 2 | 1   | d121951c4f59 | 0    | -75  |
| 3 | 2   | f510c26dd06e | 0    | -67  |
| 4 | 3   | 6b4a7aeafc89 | 110  | -69  |
| 5 | 4   | 70bf2426cf00 | 110  | -34  |
| 6 | 5   | 6b6453d28038 | 110  | -64  |
| 7 | 6   | fa6ab5780a95 | 0    | -62  |

USER INFORMATION GENERATION METHOD AND DEVICE

CROSS REFERENCE TO RELATED APPLICATIONS

This is a continuation application of International Patent Application No. PCT/KR2022/002308, filed on Feb. 16, 2022, which claims priority to Korean patent application No. KR 10-2021-0020360 filed on Feb. 16, 2021, contents of both of which are incorporated herein by reference in their entireties.

BACKGROUND

Technical Field

The present disclosure relates to a user information generation method and a user information generation apparatus for generating user count information and movement trend detection information about users in a specified range using a Bluetooth Low Energy (BLE) communication-based electronic device possessed by a user.

Description of Related Technology

A location-based service (LBS) is a technology that has been most noticed recently as a location information-based system and service comprehensively utilizing IT technology and a mobile communication network for a smart device, such as a cellular phone and a PDA, and is being applied to all areas of daily life from product information based on location information about a user to traffic information and location tracking information. The location-based service includes driving convenience information, public transportation information, and route search and setting as traffic-related information, and location tracking, personal location information, and lost device tracking as the location tracking information.

The location-based service may frequently require not only the accurate location of a single object or a plurality of objects but also approximated information, such as a certain range or approach, departure, and stay in the range. To meet these requirements, a location may be approximated using a GPS mounted in a smart device or based on a connected wired or wireless network or mobile communication network.

SUMMARY

An aspect of the present disclosure is to address a constraint, such as a user's consent to use of personal information when detecting a user count and a movement trend of users.

An aspect of the present disclosure is to solve a restriction in detecting a user count and a movement trend in a service space, such as an indoor place or a tunnel, which a GPS signal does not reach.

An aspect of the present disclosure is to detect a user count and a movement trend of users with low cost and to simply apply the user count and the movement trend of the users.

An aspect of the present disclosure is to enable detection of a user count and a movement trend of users within a relatively narrow range of several meters.

Aspects to be achieved in the present disclosure are not limited to those mentioned above, and other aspects and advantages of the present disclosure not mentioned will be understood from the following description and will be made clear from embodiments of the present disclosure. Further, it will be appreciated that the aspects and advantages to be achieved in the present disclosure can be realized by methods and combinations thereof indicated in the claims.

A method for generating user information according to an embodiment may include: collecting, from at least one smart device counting apparatus, smart device count information generated using a signal transmitted by at least one smart device within a predetermined range; generating user count information as a result of calculating a number of users within the range by applying an average number of smart devices possessed by each person to the smart device count information; generating location estimation information about the smart device, based on the smart device count information; and generating movement trend detection information about users by combining the location estimation information about the smart device, the user count information, and map information.

An apparatus for generating user information according to an embodiment may include: a processor; and a memory configured to be operatively connected to the processor and to store at least one code performed by the processor, wherein the memory may be configured to store a code that, when executed by the processor, causes the processor to collect, from at least one smart device counting apparatus, smart device count information generated using a signal transmitted by at least one smart device within a predetermined range, generate user count information as a result of calculating a number of users within the range by applying an average number of smart devices possessed by each person to the smart device count information, generate location estimation information about the smart device, based on the smart device count information, and generate movement trend detection information about users by combining the location estimation information about the smart device, the user count information, and map information.

In addition, there may be further provided a different method and a different system for achieving the present disclosure, and a computer-readable recording medium that stores a computer program to execute the method.

Aspects, features, and advantages other than those described above will be more apparent from the following drawings, claims, and detailed description.

A method according to the present disclosure does not operate based on sensitive personal information, such as a GPS location or credit card payment information, applied to a conventional location-based service, and may thus be more flexible in providing a relevant service than an existing method.

In addition, a low-cost and low-power BLE-based smart device counting apparatus may be available in an indoor place or a tunnel that a GPS signal does not reach, may be used in a relatively narrow range that is specified, and may identify overall user flow through a plurality of devices.

Effects of the present disclosure are not limited to those mentioned above, and other effects not mentioned will be clearly understood by those skilled in the art from the following description.

BRIEF DESCRIPTION OF THE DRAWINGS

FIG. 5 to FIG. 7 illustrate generation of user count information by the user information generation apparatus according to an embodiment.

DETAILED DESCRIPTION

Figure 1:
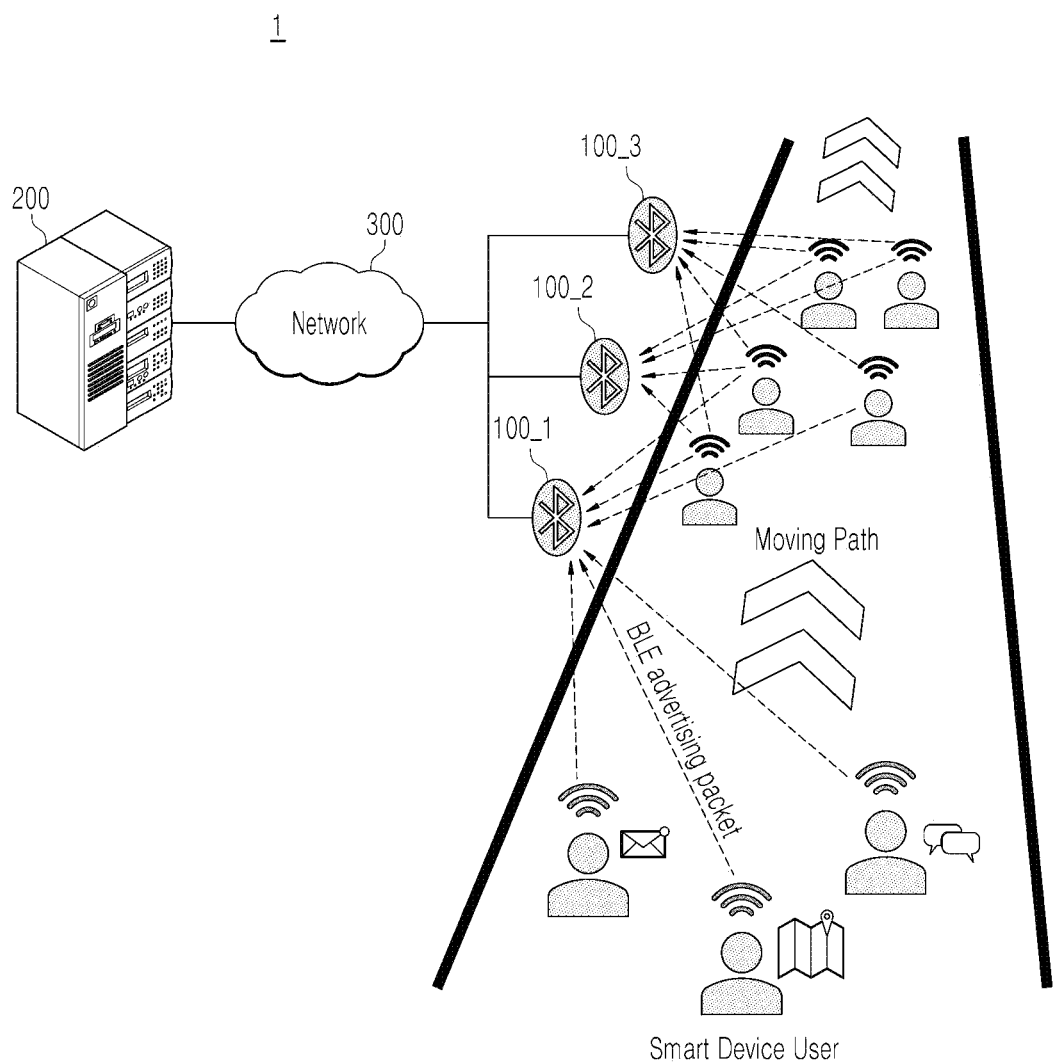
FIG. 1 illustrates an information generation environment including a smart device user, a smart device counting apparatus, a user information generation apparatus, and a network to connect the smart device counting apparatus and the user information generation apparatus according to an embodiment.

A system tracking a user's flow and movement using a GPS accesses a GPS device through the user's consent, obtains data, and collects the data through a network, such as the Internet, and thus is subjected to legal responsibilities, such as consent to use of personal information, and may entail a constraint due to weakening of a GPS signal in an indoor space. Since wired and wireless networks, such as Wi-Fi or Ethernet, specify a range for a connected IP, the accuracy of location information is relatively low. Wi-Fi may specify the coverage of connection, in which case a user's consent may also be required as in the GPS. A system based on a mobile communication network, such as a 3G or 4G network, provides relatively accurate location information based on a connected cell along with the safe security performance of mobile communication, but provides less accurate location information than GPS and can be served only by a network operator.

Advantages and features of the present disclosure and methods for achieving the same will be apparent with reference to embodiments described below in detail in conjunction with the accompanying drawings. However, it should be understood that the present disclosure is not limited to the following embodiments but may be configured in different forms and includes all changes, equivalents, or replacements belonging to the idea and technical scope of the present disclosure. The following embodiments are provided so that the present disclosure will be thorough and complete and will fully convey the scope of the disclosure to those skilled in the art to which the disclosure pertains. When detailed descriptions about related known technology are determined to make the gist of the present disclosure unclear in describing the present disclosure, the detailed descriptions will be omitted herein.

The terminology used herein is for the purpose of describing particular embodiments only and is not intended to limit the present disclosure. Singular forms may include plural forms as well unless the context clearly indicates otherwise. As used herein, the term "include", "have", or the like should be construed to indicate the existence of a feature, a number, a step, an operation, an element, a component, or a combination thereof stated in this specification but should not be construed to exclude the existence of or a possibility of an addition of one or more other features, numbers, steps, operations, elements, components, or combinations thereof. The terms "first", "second", and the like may be used to modify various components, but components should not be limited by these terms. These terms are used only to distinguish a component from another component.

As used herein, a "unit" may refer to a hardware component, such as a processor or a circuit, and/or a software component executed by a hardware component, such as a processor.

Hereinafter, embodiments according to the present disclosure will be described in detail with reference to the accompanying drawings, in which like or similar elements are denoted by like reference numerals and redundant descriptions thereof will be omitted.

FIG. 1 illustrates an information generation environment including a smart device user, a smart device counting apparatus, a user information generation apparatus, and a network to connect the smart device counting apparatus and the user information generation apparatus according to an embodiment. Referring to FIG. 1, the information generation environment 1 may include smart device users, the smart device counting apparatus 100, the user information generation apparatus 200, and the network 300. In the user information generation environment according to this embodiment, there may be a plurality of smart device counting apparatuses (e.g., 100_1, 100_2, and 100_3), and each smart device counting apparatus may have a predetermined range to cover. Here, the predetermined range can be a range measured from the smart device counting apparatus (e.g., within 10 m of radius). The predetermined range can be pre-determined by a designer of the embodiment or can be variously determined based on the environment where the embodiment is installed before the information is collected. For example, the environment may include external conditions, such as, season, time, detected number of smart devices, distance between adjacently installed smart device counting apparatus, and whether adjacent smart device counting apparatus working normally.

The smart device counting apparatus 100 may generate smart device count information using a signal transmitted by at least one smart device located within a predetermined range, and may transmit a smart device count result to the user information generation apparatus 200.

In this embodiment, a smart device may include a communication terminal possessed by a user located within a predetermined range and capable of performing a function of a computing device (not shown), and may include a mobile computing device, such as a smartphone, a notebook computer, a tablet PC, an e-book terminal, a digital broadcasting terminal, a navigation device, a kiosk, an MP3 player, and a digital camera, operated by a user. In addition, the smart device may be a wearable terminal, such as a watch, glasses, a hair band and ring, and an earphone, having a communication function and a data processing function. The smart device is not limited to the above examples, and a terminal capable of web browsing may be employed without limitation.

In this embodiment, the smart device may be an electronic device having a Bluetooth Low Energy (BLE) communication function. BLE is a low-speed short-range communication technology, is widely used in smart devices due to a low-power protocol design, and may include a connectionless/non-encrypted transmission function to achieve low power.

The smart device counting apparatus 100 may generate smart device count information using a BLE advertising packet received from a BLE communication-based smart device. The BLE communication-based smart device may approach, stay in, or leave the range of the smart device counting apparatus 100. Since the BLE communication-based smart device frequently transmits a connectionless/non-encrypted BLE advertising packet, the smart device counting apparatus 100 may receive the BLE advertising packet to recognize and count the smart device within a signal reception range.

The BLE advertising packet that the smart device counting apparatus 100 receives from the BLE communication-based smart device may include a signal in which header data (smart device information) is combined with a 31-byte data payload (user-specified data). The header data may include a 6-byte media access control (MAC) address (Bluetooth address). The 6-byte MAC address may denote a unique address value for distinguishing the BLE communication-based smart device.

The user information generation apparatus 200 may collect smart device count information from one or three or more smart device counting apparatuses 100 to calculate the number of users, to track a movement, and to identify flow.

The user information generation apparatus 200 may apply the average number of smart devices possessed by each person to the smart device count information collected from the smart device counting apparatus 100, thereby generating user count information as a result of calculating the number of users within the range.

The user information generation apparatus 200 may generate location estimation information about the smart device based on the smart device count information, and may generate movement trend detection information about users by combining the location estimation information about the smart device, the user count information, and map information. In this embodiment, the movement trend detection information about the users may include movement detection information about users and flow detection information including time-specific distribution of users.

The network 300 may serve to connect the smart device counting apparatus 100 and the user information generation apparatus 200. The network 300 may include, for example, wired networks such as local area networks (LANs), wide area networks (WANs), metropolitan area networks (MANs), and integrated service digital networks (ISDNs), and wireless networks, such as wireless LANs, CDMA, Bluetooth, and satellite communication, but the scope of the present disclosure is not limited thereto. The network 300 may transmit and receive information using short-range communication and/or long-range communication. The short-range communication may include Bluetooth, radio frequency identification (RFID), infrared data association (IrDA), ultra-wideband (UWB), ZigBee, and wireless fidelity (Wi-Fi) technologies, and the long-range communication may include code division multiple access (CDMA), frequency division multiple access (FDMA), time division multiple access (TDMA), orthogonal frequency division multiple access (OFDMA), and single-carrier frequency division multiple access (SC-FDMA) technologies.

The network 300 may include a connection of a network element, such as a hub, a bridge, a router, and a switch. The network 300 may include one or more connected networks, for example, a multiple network environment, including a public network, such as the Internet, and a private network, such as a secure enterprise private network. Access to the network 300 may be provided through one or more wired or wireless access networks.

The network 300 may support controller area network (CAN) communication, vehicle-to-infrastructure (V2I) communication, vehicle-to-everything (V2X) communication, wireless access in vehicular environment (WAVE) communication, an Internet of Things (IoT) network for exchanging and processing information between distributed components, and/or 5G communication.

Figure 2:
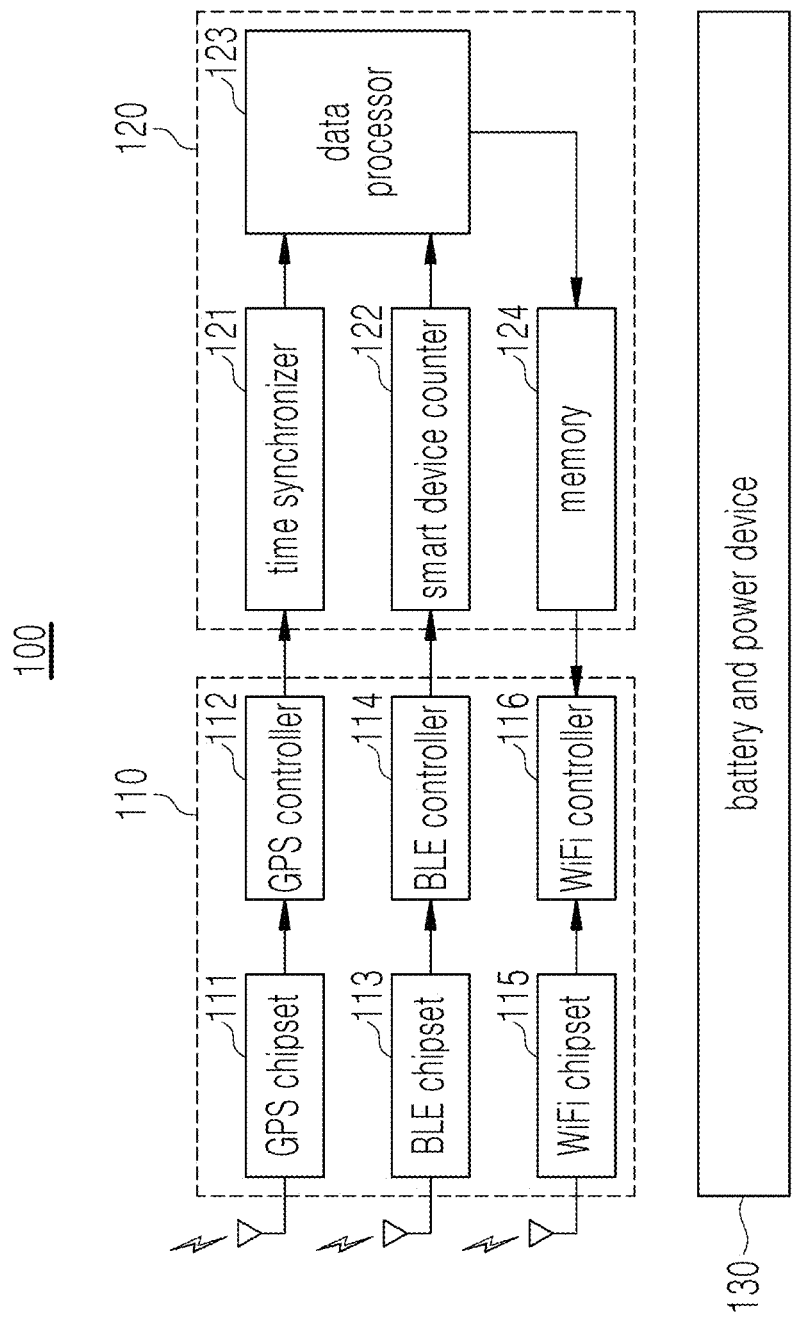
FIG. 2 is a block diagram schematically illustrating the configuration of the smart device counting apparatus in FIG. 1.

FIG. 2 is a block diagram schematically illustrating the configuration of the smart device counting apparatus in FIG. 1. In the following description, a description overlapping with that of FIG. 1 will be omitted. Referring to FIG. 2, the smart device counting apparatus 100 may include a communication and control device 110 including a communication device and a device to control the same, a data processing and storage device 120 to process and store data obtained from the communication and control device 110, and a battery and power device 130 to supply power to each component.

Referring to FIG. 2, the communication and control device 110 may include a GPS chipset 111, a GPS controller 112, a BLE chipset 113, a BLE controller 114, a Wi-Fi chipset 115, and a Wi-Fi controller 116.

The GPS chipset 111 and the GPS controller 112 may process time synchronization between a smart device and the smart device counting apparatus 100 through a GPS. In this embodiment, the GPS chipset 111 and the GPS controller 112 may be replaced with 3G to 5G mobile communication chipsets and mobile communication controllers. Here, a mobile communication network enables both time synchronization and Internet communication.

The BLE chipset 113 and the BLE controller 114 may receive a BLE advertising packet from the smart device to detect the smart device.

The Wi-Fi chipset 115 and the Wi-Fi controller 116 may perform data communication with the user information generation apparatus 200. In this embodiment, the Wi-Fi chipset 115 and the Wi-Fi controller 116 are a communication interface for communication with the user information generation apparatus 200, and may be configured as a wired interface, such as an Ethernet chipset and an Ethernet controller.

Referring to FIG. 2, the data processing and storage device 120 may include a time synchronization unit or a time synchronizer 121, a smart device counting unit or a smart device counter 122, a data processing unit or a data processor 123, and a memory 124.

The time synchronizer 121 may synchronize the time of the smart device with the user information generation apparatus 200 through a GPS or a mobile communication network. The smart device counter 122 may generate smart device count information by counting the number of smart devices detected through BLE communication. The data processor 123 may generate data in which the smart device count information is combined with synchronized time information. The memory 124 may store information generated by the data processor 123 and transmit the information to the user information generation apparatus 200 through the Wi-Fi chipset 115 and the Wi-Fi controller 116.

Figure 3:
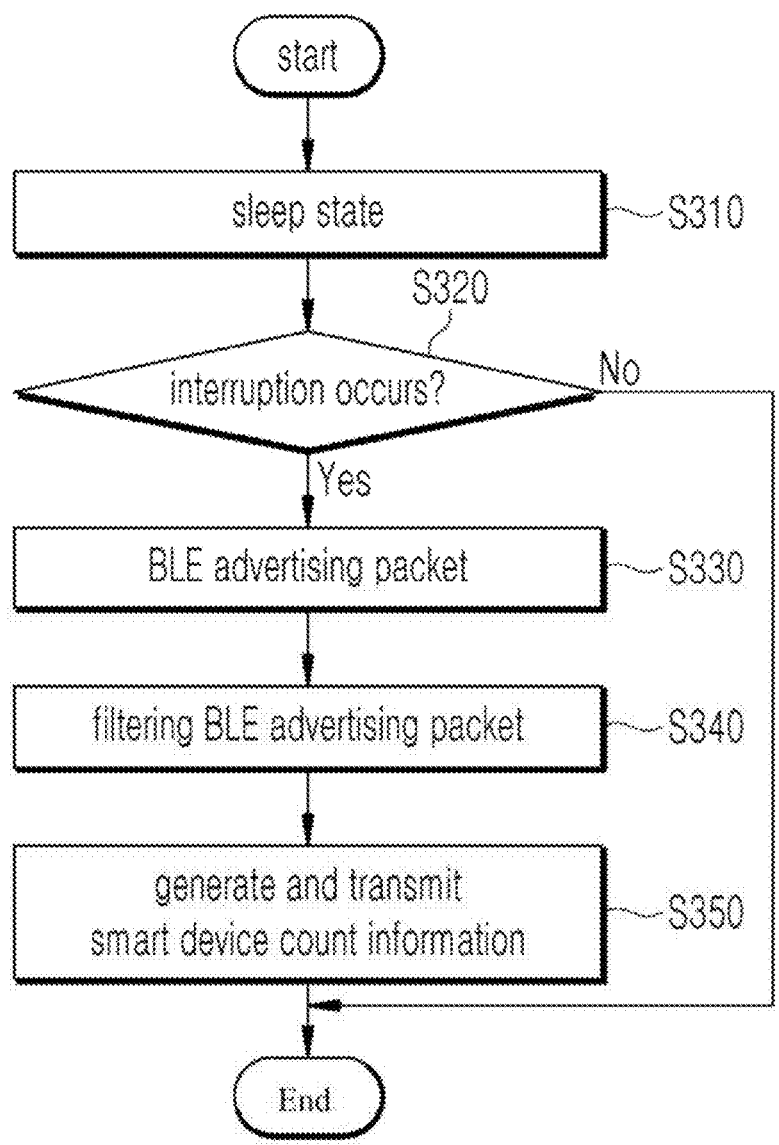
FIG. 3 is a flowchart illustrating a counting method of the smart device counting apparatus in FIG. 1.

FIG. 3 is a flowchart illustrating a counting method of the smart device counting apparatus in FIG. 1. In the following description, a description overlapping with those of FIG. 1 and FIG. 2 will be omitted. The counting method according to the present embodiment may be performed by the smart device counter 122, and for convenience of description, the description will be made assuming that the counting method is performed by the smart device counting apparatus 100.

Referring to FIG. 3, in operation S310 and operation S320, the smart device counting apparatus 100 may maintain a sleep state, and an interruption may occur when the smart device counting apparatus 100 wakes up from the sleep state.

In operation S330, when the interruption occurs, the smart device counting apparatus 100 may receive a BLE advertising packet transmitted by a smart device for a preset time (t). Here, the smart device counting apparatus 100 may also receive a received signal strength indicator (RSSI), observed when receiving the BLE advertising packet from the smart device, and a timestamp. The RSSI may be received from the BLE controller 114, and the timestamp may be received from the time synchronizer 121.

In operation S340, the smart device counting apparatus 100 may filter the received BLE advertising packet. In another embodiment, filtering of the BLE advertising packet may be performed by the user information generation apparatus 200.

In an embodiment, the smart device counting apparatus 100 may perform first filtering of removing, based on a MAC address included in a BLE advertising packet, an overlapping BLE advertising packet from a BLE advertising packet list of a collection of BLE advertising packets transmitted by at least one smart device for the preset time. In another embodiment, the smart device counting apparatus 100 may perform second filtering of removing a BLE advertising packet having an RSSI of less than a preset strength (e.g., −80 dBm) from the result of the first filtering. In still another embodiment, the smart device counting apparatus 100 may perform third filtering of identifying a smart device (e.g., iBeacon, Eddystone, or the like) at a widely known location that is fixed by decoding data included in a BLE advertising packet, and removing the smart device at the fixed location from the result of the first filtering.

In the present embodiment, terms "first", "second", "third", and the like are not intended to limit components but may be used to distinguish one component from another component.

In operation S350, the smart device counting apparatus 100 may generate smart device count information from the result of filtering the BLE advertising packet and may transmit the smart device count information to the user information generation apparatus 200.

The smart device counting apparatus 100 may generate, as the smart device count information, the total number of BLE advertising packets included in the result of the first filtering of removing, based on the MAC address included in the BLE advertising packet, the overlapping BLE advertising packet from the BLE advertising packet list of the collection of the BLE advertising packets transmitted by the at least one smart device for the preset time. Further, the smart device counting apparatus 100 may generate, as the smart device count information, the total number of BLE advertising packets included in the result of the second filtering of removing the BLE advertising packet having the RSSI of less than the preset strength (e.g., −80 dBm) from the result of the first filtering. In addition, the smart device counting apparatus 100 may generate, as the smart device count information, the total number of BLE advertising packets included in the result of the third filtering of identifying the smart device (e.g., iBeacon, Eddystone, or the like) at the widely known location that is fixed by decoding the data included in the BLE advertising packet, and removing the smart device at the fixed location from the result of the first filtering. In the present embodiment, the total number of BLE advertising packets included in at least one filtering result among the result of the first filtering to the result of the third filtering may be generated as the smart device coefficient information.

In the present embodiment, the smart device count information generated by the smart device counting apparatus 100 and transmitted to the user information generation apparatus 200 may further include location information about the smart device having generated the smart device count information.

In the present embodiment, the smart device counting apparatus 100 may transmit the smart device count information together with the RSSI and the timestamp to the user information generation apparatus 200. In the present embodiment, the smart device counting apparatus 100 may transmit the smart device count information including the RSSI and the timestamp to the user information generation apparatus 200.

Figure 4:
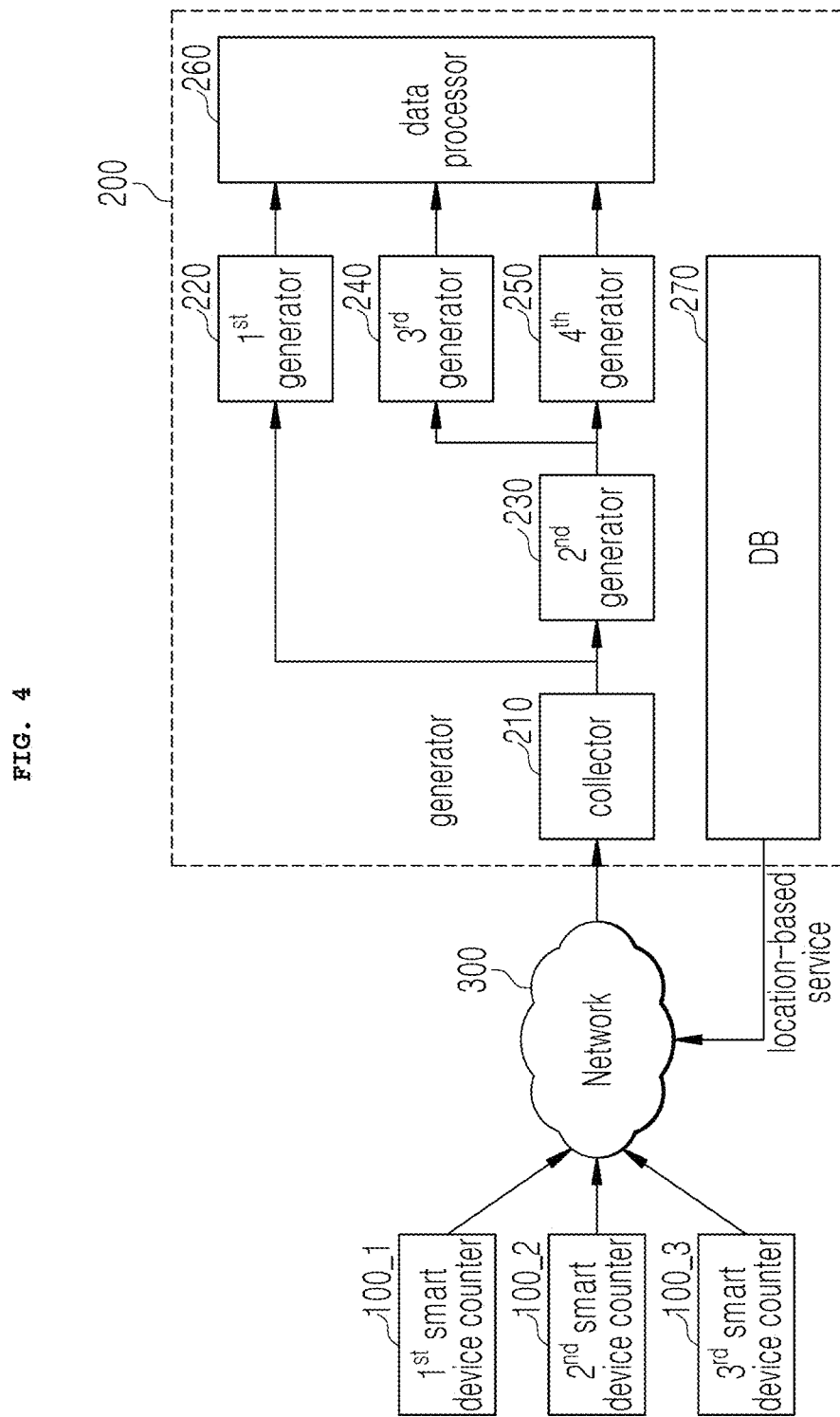
FIG. 4 is a block diagram schematically illustrating the configuration of the user information generation apparatus in FIG. 1 according to an embodiment.

FIG. 4 is a block diagram schematically illustrating the configuration of the user information generation apparatus in FIG. 1 according to an embodiment. In the following description, a description overlapping with those of FIG. 1 to FIG. 3 will be omitted. Referring to FIG. 4, the user information generation apparatus 200 includes a collector 210, a first generator 220, a second generator 230, a third generator 240, a fourth generator 250, a data processor 260, and a database 270.

The collector 210 may collect smart device count information from three or more smart device counting apparatuses 100_1, 100_2, and 100_3. In an embodiment, when collecting the smart device count information from the three or more smart device counting apparatuses 100_1, 100_2, and 100_3, the collector 210 may collect, as the smart device count information, the total number of BLE advertising packets included in the result of first filtering of removing, based on a MAC address included in a BLE advertising packet, an overlapping BLE advertising packet from a BLE advertising packet list of a collection of BLE advertising packets transmitted by at least one smart device for a preset time.

In another embodiment, when collecting the smart device count information from the three or more smart device counting apparatuses 100_1, 100_2, and 100_3, the collector 210 may collect, as the smart device count information, the total number of BLE advertising packets included in the result of second filtering of removing a BLE advertising packet having an RSSI of less than a preset strength from the result of the first filtering.

In still another embodiment, when collecting the smart device count information from the three or more smart device counting apparatuses 100_1, 100_2, and 100_3, the collector 210 may collect, as the smart device count information, the total number of BLE advertising packets included in the result of third filtering of identifying a smart device at a fixed location by decoding data included in a BLE advertising packet, and removing the smart device at the fixed location from the result of the first filtering.

In yet another embodiment, when collecting the smart device count information from the three or more smart device counting apparatuses 100_1, 100_2, and 100_3, the collector 210 may collect a BLE advertising packet list of a collection of BLE advertising packets having not been subjected to the first filtering to the third filtering.

In still another embodiment, the collector 210 may collect smart device count information including location information about a smart device having generated the smart device count information from a smart device counting apparatus 100.

The first generator 220 may generate user count information as a result of calculating the number of users within a range by applying the average number of smart devices possessed by each person to the smart device count information. The first generator 220 may calculate the number of users within the range through a probability and statistics investigated in advance using Equation 1, and may generate the user count information.

$$N_{user}=A \times N_{smart} \qquad \text{[Equation 1]}$$

In Equation 1, $N_{user}$ may denote the number of users in the range, A may denote the average number of smart devices possessed by each person, and $N_{smart}$ may denote the number of smart devices in the range.

In an optional embodiment, the first generator 220 may extract demographic information about a corresponding location according to location information about the smart device counting apparatus 100 that generates the smart device count information, and may determine the average number of smart devices possessed by each person in the location, based on the demographic information. The demographic information may include information about the age and gender of a user visiting the location, and the user count information may be determined based on the smart device count information and the average number of smart devices possessed by each person according to the age and gender of the user.

In the present embodiment, demographic information by location may be previously stored in the user information generation apparatus 200, or may be received by the user information generation apparatus 200 accessing a device (e.g., a public server) that provides the demographic information by location.

The second generator 230 may generate location estimation information about a smart device, based on the smart device count information. In the present embodiment, the location estimation information about the smart device may be the same as location estimation information about the user.

In an embodiment, the second generator 230 may estimate the location of the smart device using a trilateration method. The second generator 230 may calculate the distance from the smart device to each of a first smart device counting apparatus 100_1 to a third smart device counting apparatus 100_3 using an RSSI included in count information about the smart device. The second generator 230 may calculate the distance from the smart device to each of a first smart device counting apparatus 100_1 to a third smart device counting apparatus 100_3 using path loss denoting the difference between a transmission strength (predetermined) and a reception strength (RSSI). The second generator 230 may generate the location estimation information about the smart device by putting the locations of the first smart device counting apparatus 100_1 to the third smart device counting apparatus 100_3, which are already known, and the distance from the smart device to each of the first smart device counting apparatus 100_1 to the third smart device 100_3 into the equation of a circle. Details of the trilateration method will be described in detail with reference to FIG. 8.

In another embodiment, the second generator 230 may estimate the location of the smart device using a TDOA method. The second generator 230 may calculate a first distance difference, which is the difference between the distance from the smart device to the third smart device counting apparatus 100_3 and the distance from the smart device to the second smart device counting apparatus 100_2, and a second distance difference, which is the difference between the distance from the smart device to the third smart device counting apparatus 100_3 and the distance from the smart device to the first smart device counting apparatus 100_2, using a difference in timestamp included in the count information about the smart device and the speed of radio waves. The second generator 230 may generate the location estimation information about the smart device by putting the locations of the first smart device counting apparatus 100_1 to the third smart device counting apparatus 100_3, which are already known, the first distance difference, and the second distance difference into a hyperbolic equation. Details of the TDOA method will be described in detail with reference to FIG. 9.

The third generator 240 may generate movement detection information about users by combining the user count information generated by the first generator 220 and the location estimation information about the smart device and map information generated by the second generator 230.

The fourth generator 250 may generate flow detection information including time-specific distribution of users by combining the user count information generated by the first generator 220 and the location estimation information about the smart device and the map information generated by the second generator 230.

The data processor 260 may collect the user count information generated by the first generator 220, the location estimation information about the smart device generated by the second generator 230, the movement detection information about the users generated by the third generator 240, and the flow detection information generated by the fourth generator 250.

The database 270 may store data collected by the collector 210 and data collected by the data processor 260 and may provide the date for a location-based service.

FIG. 5 to FIG. 7 illustrate generation of user count information by the user information generation apparatus according to an embodiment. In the following description, a description overlapping with those of FIG. 1 to FIG. 3 will be omitted. In the present embodiment, the generation of the user count information may be performed by the first generator 220 in the user information generation apparatus 200.

FIG. 5 illustrates the result of receiving a BLE advertising packet received and processed by the smart device counting apparatus 100 or collected by the user information generation apparatus 200 from the smart device counting apparatus 100. In FIG. 5, No. may denote the number of received BLE advertising packets, MAC Address may denote the address of a received BLE advertising packet, Type may denote the type (connectable, scannable, or directable) of the received BLE advertising packet, and RSSI may denote a received signal strength indicator. FIG. 6 illustrates the result of first filtering of removing an overlapping advertising packet from the result of receiving the BLE advertising packet of FIG. 5, based on a MAC address.

Meanwhile, the smart device counting apparatus 100 locally installed to count smart devices can modify or encrypt MAC address in BLE advertising packet according to a certain rule, and can perform filtering process including removing overlapping by using modified or encrypted value (also can be referred as "smart device identifier") as explained below.

In this regard, MAC address of counted smart device is temporarily received by the smart device counting apparatus (100) without being saved and is immediately modified or encrypted without being transferred to a remote server like user information generation apparatus (200).

Also, smart device counting information may not include modified or encrypted value and may only include the number of smart devices derived from overlapping removing process.

FIG. 7 illustrates the filtering result of removing an advertising packet having an RSSI of less than a preset strength from the result of the first filtering of FIG. 6.

Referring to FIG. 5 to 7, when the number of smart devices is calculated as 6 and the number of smart devices possessed by each person is, for example, 0.7, the number of users within a range may be calculated to be about four.

Figure 8:
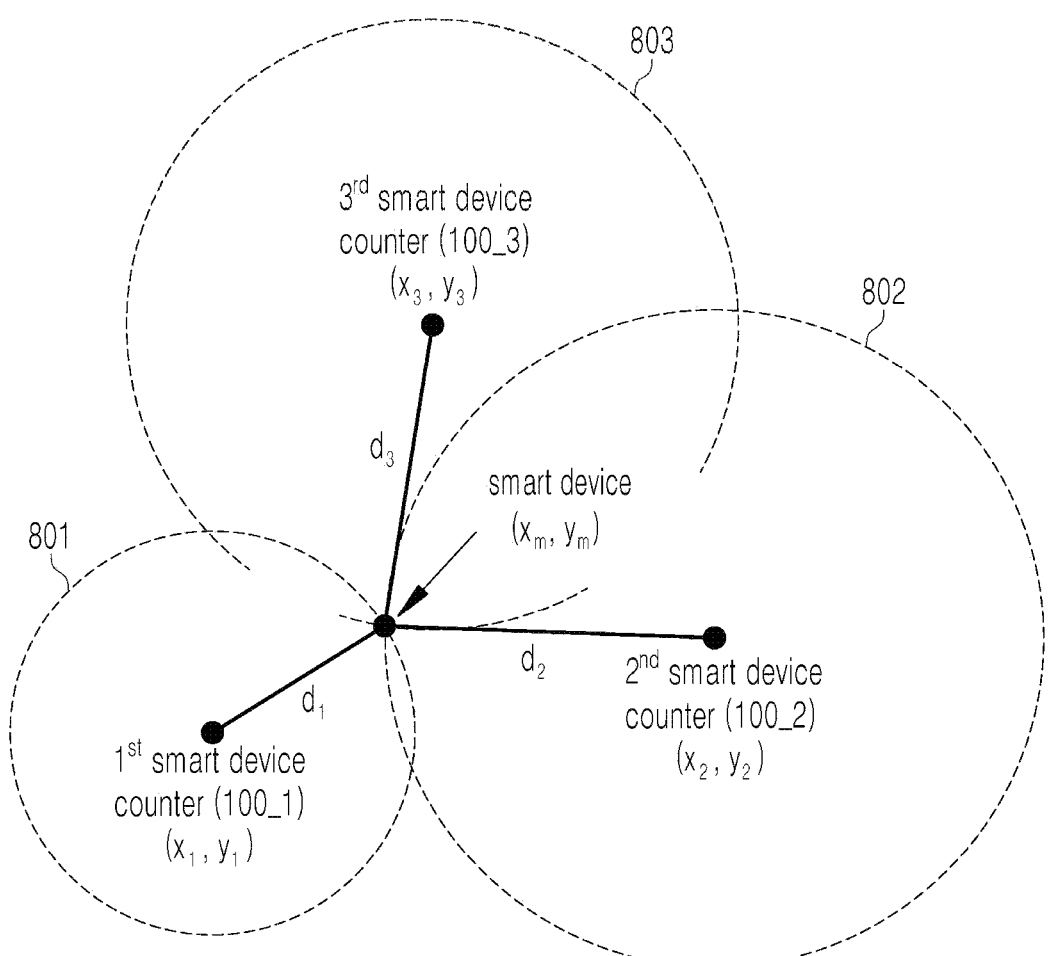
FIG. 8 and FIG. 9 illustrate generation of user location estimation information by the user information generation apparatus according to an embodiment.

FIG. 8 illustrates generation of user location estimation information by the user information generation apparatus according to an embodiment. In the following description, a description overlapping with those of FIG. 1 to FIG. 7 will be omitted. In the present embodiment, the generation of the user location estimation information may be performed by the second generator 230 in the user information generation apparatus 200.

Referring to FIG. 8, the user information generation apparatus 200 may estimate the location of a smart device using a trilateration method of estimating the common intersection point of a first circle 801, a second circle 802, and a third circle 803 as the location $(x_m, y_m)$ of the smart device.

The first circle 801 may include a circle having a center of the location $(x_1, y_1)$ of a first smart device counting apparatus 100_1 and a radius of the distance $(d_1)$ from the smart device to the first smart device counting apparatus 100_1.

The second circle 802 may include a circle having a center of the location $(x_2, y_2)$ of a second smart device counting apparatus 100_2 and a radius of the distance $(d_2)$ from the smart device to the second smart device counting apparatus 100_2.

The third circle 803 may include a circle having a center of the location $(x_3, y_3)$ of a third smart device counting apparatus 100_3 and a radius of the distance $(d_3)$ from the smart device to the third smart device counting apparatus 100_3.

In the present embodiment, the first smart device counting apparatus 100_1 to the third smart device counting apparatus 100_3 are apparatuses at fixed locations, and the user information generation apparatus 200 have already known the location $(x_1, y_1)$ of the first smart device counting apparatus 100_1, the location $(x_2, y_2)$ of the second smart device counting apparatus 100_2, and the location $(x_3, y_3)$ of the third smart device counting apparatus 100_3.

In addition, the user information generation apparatus 200 may calculate the distance $(d_1)$ from the smart device to the first smart device counting apparatus 100_1, the distance $(d_2)$ from the smart device to the second smart device counting apparatus 100_2, and the distance $(d_3)$ from the smart device to the third smart device counting apparatus 100_3 using Equation 2.

$$L = 20\log_{10}\left(\frac{4\pi d}{\lambda}\right)[dBm] \quad \text{[Equation 2]}$$

In Equation 2, path loss L (loss) is the difference between a transmission strength and a reception strength. Since the transmission strength is predetermined when designing the first smart device counting apparatus 100_1 to the third smart device counting apparatus 100_3, the distance may be calculated when obtaining only an RSSI corresponding to the reception strength. In the present embodiment, the RSSI may be observed by a BLE controller (114 in FIG. 2) in the first smart device counting apparatus 100_1 to the third smart device counting apparatus 100_3, and may be included in smart device count information. In addition, $\lambda$ may be a value known as the wavelength of a used frequency.

The user information generation apparatus 200 may generate location estimation information $(x_m, y_m)$ about the smart device as the common intersection point of the first circle 801 to the third circle 803 using a circle equation of Equation 3.

$$d_1 = \sqrt{(x_1-x_m)^2+(y_1-y_m)^2}$$

$$d_2 = \sqrt{(x_2-x_m)^2+(y_2-y_m)^2}$$

$$d_3 = \sqrt{(x_3-x_m)^2+(y_3-y_m)^2} \quad \text{[Equation 3]}$$

Figure 9:
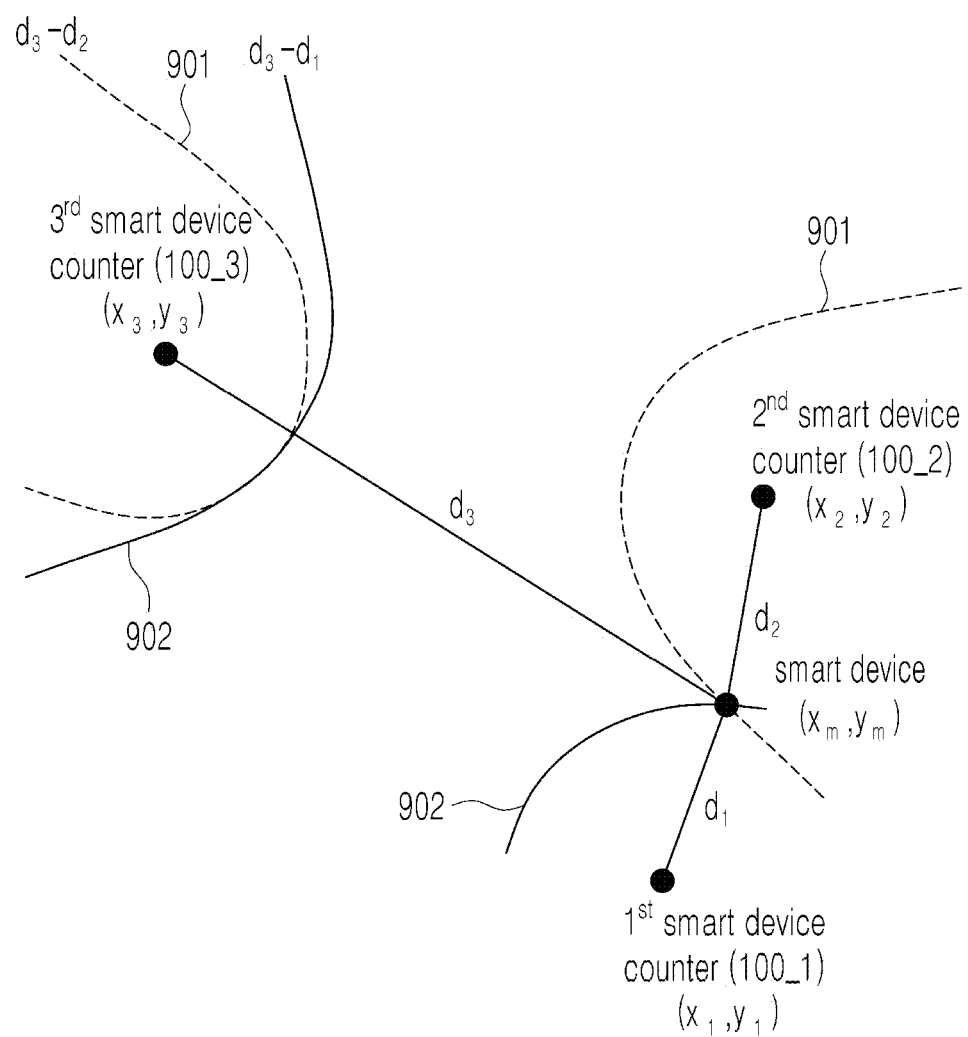

FIG. 9 illustrates generation of user location estimation information by the user information generation apparatus according to another embodiment. In the following description, a description overlapping with those of FIG. 1 to FIG. 8 will be omitted. In the present embodiment, the generation of the user location estimation information may be performed by the second generator 230 in the user information generation apparatus 200.

Referring to FIG. 9, the user information generation apparatus 200 may estimate the location of a smart device using a time of difference arrival (TDOA) method of estimating the location of a smart device using a difference in timestamp.

In the present embodiment, a first smart device counting apparatus 100_1 to a third smart device counting apparatus 100_3 are apparatuses at fixed locations, and the user information generation apparatus 200 have already known the location $(x_1, y_1)$ of the first smart device counting apparatus 100_1, the location $(x_2, y_2)$ of the second smart device counting apparatus 100_2, and the location $(x_3, y_3)$ of the third smart device counting apparatus 100_3.

The first smart device counting apparatus 100_1 to the third smart device counting apparatus 100_3 store a timestamp as information about a time at which an advertising packet is received from the smart device, and the timestamp may be included in smart device count information.

In the TDOA method, although the distance $(d_1)$ from the smart device to the first smart device counting apparatus 100_1, the distance $(d_2)$ from the smart device to the second smart device counting apparatus 100_2, and the distance $(d_3)$ from the smart device to the third smart device counting apparatus 100_3 are not known unlike in FIG. 8, a first distance difference $(d_{32})$ and a second distance difference $(d_{31})$ may be obtained using a timestamp difference.

The first distance difference $(d_{32})$ may denote the difference between the distance from the smart device to the third smart device counting apparatus 100_3 and the distance from the smart device to the second smart device counting apparatus 100_2. The second distance difference $(d_{31})$ may denote the difference between the distance from the smart device to the third smart device counting apparatus 100_3 and the distance from the smart device to the first smart device counting apparatus 100_1.

Since distance is the product of the speed of light (the speed of radio waves in this embodiment) and time, a difference in distance may be the product of the speed of light and a time difference. The time difference may be a timestamp difference, and the first distance difference ($d_{32}$) and the second distance difference ($d_{31}$) may be calculated using a timestamp difference.

Location estimation information ($x_m, y_m$) about the smart device as the common intersection point of a first hyperbola 901 and a second hyperbola 902 may be generated by putting the first distance difference ($d_{32}$) and the second distance difference ($d_{31}$), which are obtained as above, the location ($x_1, y_1$) of the first smart device counting apparatus 100_1, the location ($x_2, y_2$) of the second smart device counting apparatus 100_2, and the location ($x_3, y_3$) of the third smart device counting apparatus 100_3, which are already known, into Equation 4. The location of the smart device counting apparatuses may be previously known by a designer when the embodiment is installed or may be known by location detection apparatus like GPS.

$$\widetilde{d_{32}}, \widetilde{d_{31}} \rightarrow \widetilde{x_m}, \widetilde{y_m}$$

$$d_{32} = \sqrt{(x_3 - x_m)^2 + (y_3 - y_m)^2} - \sqrt{(x_2 - x_m)^2 + (y_2 - y_m)^2}$$

$$d_{31} = \sqrt{(x_3 - x_m)^2 + (y_3 - y_m)^2} - \sqrt{(x_1 - x_m)^2 + (y_1 - y_m)^2}$$ [Equation 4]

Equation 4 is a hyperbolic equation showing that, in a hyperbola having two-dimensional positions F and F' as focal points, the difference between the distances from any point P on the hyperbola to the respective focal points is constant according to the hyperbolic theory.

In the present embodiment, the location estimation information ($x_m, y_m$) about the smart device as the common intersection point of the first hyperbola 901 of the third smart device counting apparatus 100_3 and the second smart device counting apparatus 100_2 and the second hyperbola 902 of the third smart device counting apparatus 100_3 and the first smart device counting apparatus 100_1 having ($x_1, y_1$) of the first smart device counting apparatus 100_1, ($x_2, y_2$) of the second smart device counting apparatus 100_2, and ($x_3, y_3$) of the third smart device counting apparatus 100_3 as the focal points may be generated using features of the hyperbolic theory.

Figure 10:
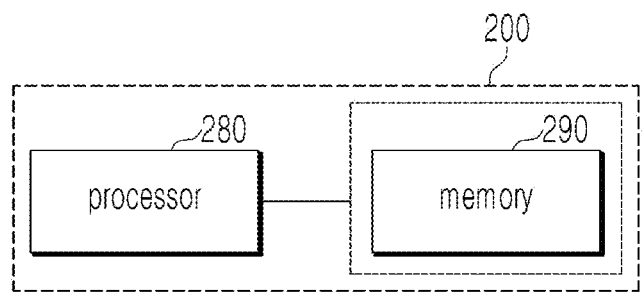
FIG. 10 is a block diagram schematically illustrating the configuration of the user information generation apparatus in FIG. 1 according to another embodiment.

FIG. 10 is a block diagram schematically illustrating the configuration of the user information generation apparatus in FIG. 1 according to another embodiment. In the following description, a description overlapping with those of FIG. 1 to FIG. 9 will be omitted. Referring to FIG. 10, the user information generation apparatus 200 according to the other embodiment may include a processor 280 and a memory 290.

In the present embodiment, the processor 280 may process functions performed by the collector 210, the first generator 220, the second generator 230, the third generator 240, the fourth generator 250, and the data processor 260 of FIG. 4.

The processor 280 may control the overall operation of the user information generation apparatus 200. Here, the "processor" may refer to a data processing device embedded in hardware, for example, which has a physically structured circuit to perform a function expressed as a code or an instruction included in a program. Examples of the data processing device embedded in the hardware may include processing devices, such as a microprocessor, a central processor (CPU), a processor core, a multiprocessor, an application-specific integrated circuit (ASIC), and a field programmable gate array (FPGA), but the scope of the present disclosure is not limited thereto.

The memory 290 may be operatively connected to the processor 280 and may store at least one code in association with an operation performed by the processor 280.

The memory 290 may perform a function of temporarily or permanently storing data processed by the processor 280, and may store the data stored in the database 270 of FIG. 4 in an embodiment. The memory 290 may include magnetic storage media or flash storage media, but the scope of the present disclosure is not limited thereto. The memory 290 may include an internal memory and/or an external memory, and may include a volatile memory, such as a DRAM, a SRAM, or a SDRAM, a nonvolatile memory, such as a one-time programmable ROM (OTPROM), a PROM, an EPROM, an EEPROM, a mask ROM, a flash ROM, an NAND flash memory, or an NOR flash memory, a flash drive, such as an SSD, a compact flash (CF) card, an SD card, a micro-SD card, a mini-SD card, an Xd card, or a memory stick, or a storage device, such as an HDD.

Figure 11:
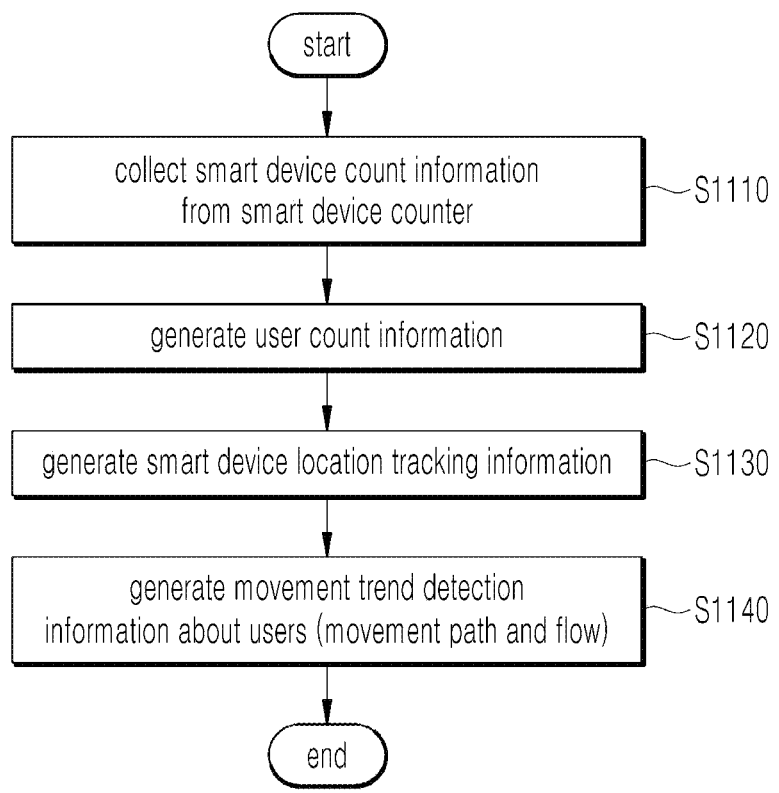
FIG. 11 is a flowchart illustrating a user information generation method according to an embodiment.

FIG. 11 is a flowchart illustrating a user information generation method according to an embodiment. In the following description, a description overlapping with those of FIG. 1 to FIG. 10 will be omitted.

Referring to FIG. 11, in operation S1110, the user information generation apparatus 200 may collect smart device count information generated using a signal transmitted from at least one smart device within a predetermined range from at least one smart device counting apparatus 100.

In the present embodiment, the user information generation apparatus 200 may collect smart device count information calculated using a BLE advertising packet transmitted by at least one BLE communication-based smart device from the smart device counting apparatus 100. In addition, when collecting the smart device count information, the user information generation apparatus 200 may collect, as the smart device count information, the total number of BLE advertising packets included in the result of first filtering of removing, based on a MAC address included in a BLE advertising packet, an overlapping BLE advertising packet from a BLE advertising packet list of a collection of BLE advertising packets transmitted by the at least one smart device for a preset time. Further, the user information generation apparatus 200 may collect the advertising packet list further including an RSSI observed when receiving the advertising packet and a timestamp at which the advertising packet is received. In addition, the user information generation apparatus 200 may collect, as the smart device count information, the total number of BLE advertising packets included in the result of second filtering of removing a BLE advertising packet having an RSSI of less than a preset strength from the result of the first filtering. Furthermore, the user information generation apparatus 200 may collect, as the smart device count information, the total number of BLE advertising packets included in the result of third filtering of identifying a smart device at a fixed location by decoding the data included in the BLE advertising packet, and removing the smart device at the fixed location from the result of the first filtering.

In operation S1120, the user information generation apparatus 200 may generate user count information as a result of calculating the number of users within the range by applying the average number of smart devices possessed by each person to the smart device count information. The user information generation apparatus 200 may generate the user count information through Equation 1 illustrated above.

In an optional embodiment, the user information generation apparatus 200 may extract demographic information about a corresponding location according to location information about the smart device counting apparatus 100 that generates the smart device count information, and may determine the average number of smart devices possessed by each person in the location, based on the demographic information. The demographic information may include information about the age and gender of a user visiting the location, and the user count information may be determined based on the smart device count information and the average number of smart devices possessed by each person according to the age and gender of the user.

Meanwhile, a method for estimating the number of users according to the number of smart devices may include utilizing relative location change of smart devices in addition to the method utilizing an average number of smart devices possessed by each person as explained above.

For example, the smart device counting apparatus or the user information generation apparatus may monitor location of smart devices or a distance between smart devices for a certain period of time, and may determine smart devices whose distance between them remains the same over a certain period of time as smart devices belonging to one user to estimate the number of users according to the number of smart devices.

The number of users generated by using change in relative locations of smart devices may be compared to the number of users estimated by the method utilizing an average number of smart devices possessed by each person, and the correctness of estimation can be calculated by the comparison, and the average number of users estimated by above two methods can be used as a final estimation.

In another embodiment, if the difference in the estimated number of users according to the two methods is over a predetermined value, it can be displayed that the estimated number of users cannot be trusted.

In operation S1130, the user information generation apparatus 200 may generate location estimation information of the smart device, based on the smart device count information. In an embodiment, the user information generating apparatus 200 may estimate the location of the smart device using a trilateration method. The user information generation apparatus 200 may calculate the distance from the smart device to each of a first smart device counting apparatus 100_1 to a third smart device counting apparatus 100_3 using the RSSI included in count information about the smart device. The second generator (230) may calculate the distance from the smart device to each of a first smart device counting apparatus 100_1 to a third smart device counting apparatus 100_3 using path loss denoting the difference between a transmission strength (predetermined) and a reception strength (RSSI). The user information generation apparatus 200 may generate the location estimation information about the smart device by putting the locations of the first smart device counting apparatus 100_1 to the third smart device counting apparatus 100_3, which are already known, and the distance from the smart device to each of the first smart device counting apparatus 100_1 to the third smart device 100_3 into the equation of a circle. In another embodiment, the user information generation apparatus 200 may estimate the location of the smart device 100 using a TDOA method. The user information generation apparatus 200 may calculate a first distance difference, which is the difference between the distance from the smart device to the third smart device counting apparatus 100_3 and the distance from the smart device to the second smart device counting apparatus 100_2, and a second distance difference, which is the difference between the distance from the smart device to the third smart device counting apparatus 100_3 and the distance from the smart device to the first smart device counting apparatus 100_1, using a difference in timestamp included in the count information about the smart device and the speed of radio waves. The user information generation apparatus 200 may generate the location estimation information about the smart device by putting the locations of the first smart device counting apparatus 100_1 to the third smart device counting apparatus 100_3, which are already known, the first distance difference, and the second distance difference into a hyperbolic equation.

In operation S1140, the user information generation apparatus 200 may generate movement trend detection information about users by combining the location estimation information about the smart device, the user count information, and map information. The user information generation apparatus 200 may generate the location estimation information (movement detection information and flow detection information including time-specific distribution of users) about the smart device.

The foregoing embodiments according to the present disclosure may be configured in the form of computer programs that can be executed through various components on a computer, and the computer programs may be recorded in a computer-readable medium. The medium may include magnetic media, such as a hard disk, a floppy disk, and a magnetic tape, optical media, such as a CD-ROM and a DVD, magneto-optical media, such as a floptical disk, and a hardware device specially configured to store and perform a program instruction, such as a ROM, a RAM, and a flash memory.

The computer programs may be specially designed and configured for the present disclosure, or may be known and available to those skilled in computer software. Examples of the computer programs may include not only a machine code made by a compiler but also a high-level language code that executable by a computer using an interpreter.

As used in the specification of the present disclosure (especially in the claims), the term "the" and similar references are to be construed to cover both a singular form and a plural form. Furthermore, recitation of a range herein is merely intended to cover a disclosure employing each separate value falling within the range, and (unless otherwise indicated herein) each separate value is incorporated into the specification as if it were individually recited herein.

Operations of a method according to the present disclosure may be performed in an appropriate order unless explicitly stated or otherwise. The present disclosure is not necessarily limited to the order in which the operations are stated. All examples or exemplary language (e.g., such as) used in the present disclosure is merely for the purpose of describing the present disclosure in detail, and the scope of the present disclosure is limited by these examples or illustrative terms unless defined by the claims. Those skilled in the art will appreciate that various modifications, changes, and combinations can be made according to design conditions and factors within the scope of the appended claims or equivalents thereof.

Accordingly, the spirit of the present disclosure should not be limited to the above-described embodiments, and not only the claims to be described below but also equivalents thereof or all ranges equivalently modified therefrom are construed as belonging to the scope of the spirit of the present disclosure.

What is claimed is:

1. A method for generating user information, the method comprising:

collecting, from at least one smart device counting apparatus, smart device count information generated using a signal transmitted by at least one smart device within a predetermined range;

generating user count information as a result of calculating a number of users within the range by applying an average number of smart devices possessed by each person to the smart device count information;

generating location estimation information about the smart device, based on the smart device count information; and generating movement trend detection information about users based on the location estimation information about the smart device, the user count information, and map information, wherein collecting the smart device count information comprises collecting the smart device count information generated using an advertising packet transmitted by the at least one smart device based on Bluetooth Low Energy (BLE) communication from the smart device counting apparatus, wherein, when collecting the smart device count information, a total number of advertising packets included in a result of first filtering of removing, based on a media access control (MAC) address included in the advertising packet, an overlapping advertising packet from an advertising packet list of a collection of advertising packets transmitted by the at least one smart device for a preset time is collected as the smart device count information, wherein the advertising packet list further comprises a received signal strength indicator (RSSI), observed when receiving the advertising packet, and a timestamp at which the advertising packet is received, and wherein, when collecting the smart device count information, a total number of advertising packets included in a result of second filtering of removing an advertising packet having the RSSI less than a preset strength from the result of the first filtering is collected as the smart device count information.

2. The method of claim 1, wherein, when collecting the smart device count information, a total number of advertising packets included in a result of third filtering of identifying a smart device at a fixed location by decoding data included in the advertising packet, and removing the smart device at the fixed location from the result of the first filtering is collected as the smart device count information.

3. The method of claim 1, wherein generating the location estimation information about the smart device comprises:

collecting pieces of count information about the smart device from at least three smart device counting apparatuses;

calculating a distance from the smart device to each of the at least three smart device counting apparatuses using the RSSI included in the smart device count information; and generating the location estimation information about the smart device using a location of each of the at least three smart device counting apparatuses, which is already known, and the distance from the smart device to each of the at least three smart device counting apparatuses.

4. The method of claim 1, wherein generating the location estimation information about the smart device comprises:

collecting pieces of count information about the smart device from at least three smart device counting apparatuses;

calculating a first distance difference, which is a difference between a distance from the smart device to a third smart device counting apparatus and a distance from the smart device to a second smart device counting apparatus, and a second distance difference, which is a difference between the distance from the smart device to the third smart device counting apparatus and the distance from the smart device to the first smart device counting apparatus, using a difference in timestamp included in the smart device count information and a speed of radio waves; and generating the location estimation information about the smart device using a location of each of the at least three smart device counting apparatuses, which is already known, the first distance difference, and the second distance difference.

5. The method of claim 1, wherein generating the movement trend detection information comprises:

generating movement detection information about the users based on the location estimation information about the smart device, the user count information, and the map information; and generating flow detection information comprising time-specific distribution of the users based on the location estimation information about the smart device, the user count information, and the map information.

6. The method of claim 1, wherein the smart device count information comprises the MAC address of the smart device transmitting the advertising packet, the RSSI observed when receiving the advertising packet, and the timestamp at which the advertising packet is received, and wherein collecting the smart device count information comprises:

generating the result of first filtering of removing the overlapping advertising packet from the smart device count information, based on the MAC address; and generating the result of second filtering of removing the advertising packet out of a range of a preset strength from the result of the first filtering, based on the RSSI.

7. The method of claim 1, wherein the smart device count information comprises location information about the smart device counting apparatus generating the smart device count information, and wherein generating the user count information comprises:

extracting demographic information about a corresponding location according to the location information about the smart device counting apparatus generating the smart device count information; and determining the average number of smart devices possessed by each person in the location, based on the demographic information.

8. The method of claim 7, wherein the demographic information comprises information about an age and gender of a user visiting the location, and wherein the user count information is determined based on the smart device count information and the average number of smart devices possessed by each person according to the age and gender of the user.

9. A non-transitory computer-readable recording medium storing instructions, when executed by one or more processors, configured to perform the method of claim 1.

10. An apparatus for generating user information, the apparatus comprising:

a processor; and a memory configured to be operatively connected to the processor and to store at least one code performed by the processor, wherein the memory is configured to store a code that, when executed by the processor, causes the processor to collect, from at least one smart device counting apparatus, smart device count information generated using a signal transmitted by at least one smart device within a predetermined range;

generate user count information as a result of calculating a number of users within the range by applying an average number of smart devices possessed by each person to the smart device count information;

generate location estimation information about the smart device, based on the smart device count information;

generate movement trend detection information about users based on the location estimation information about the smart device, the user count information, and map information;

collect the smart device count information generated using an advertising packet transmitted by the at least one smart device based on Bluetooth Low Energy BLE) communication from the smart device counting apparatus when collecting the smart device count information;

collect a total number of advertising packets included in a result of first filtering of removing, based on a media access control (MAC) address included in the advertising packet, an overlapping advertising packet from an advertising packet list of a collection of advertising packets transmitted by the at least one smart device for a preset time as the smart device count information when collecting the smart device count information, the advertising packet list comprising a received signal strength indicator (RSSI), observed when receiving the advertising packet, and a timestamp at which the advertising packet is received; and collect a total number of advertising packets included in a result of second filtering of removing an advertising packet having the RSSI less than a preset strength from the result of the first filtering as the smart device count information when collecting the smart device count information.

11. The apparatus of claim 10, wherein the memory is configured to store a code that causes the processor to:

collect a total number of advertising packets included in a result of third filtering of identifying a smart device at a fixed location by decoding data included in the advertising packet, and removing the smart device at the fixed location from the result of the first filtering as the smart device count information when collecting the smart device count information.

12. The apparatus of claim 10, wherein the memory is configured to store a code that causes the processor to:

collect pieces of count information about the smart device from at least three smart device counting apparatuses, calculate a distance from the smart device to each of the at least three smart device counting apparatuses using the RSSI included in the smart device count information, and generate the location estimation information about the smart device using a location of each of the at least three smart device counting apparatuses, which is already known, and the distance from the smart device to each of the at least three smart device counting apparatuses.

* * * * *